2,694,625

HERBICIDAL COMPOSITION

John C. R. Warren, Elmira, Ontario, Canada, assignor, by mesne assignments, to Union Carbide & Carbon Corporation, New York, N. Y., a corporation of New York No Drawing. Application June 30, 1950, Serial No. 171,545

15 Claims. (Cl. 71—2.6)

This invention relates to a concentrated formulation of an amine salt of a polychlorophenoxyacetic acid, especially 2,4-dichlorophenoxyacetic acid (hereinafter referred to as "2,4-D") or 2,4,5-trichlorophenoxyacetic acid (hereinafter referred to as "2,4,5-T") or mixtures of 2,4-D and 2,4,5-T, which upon admixture with hard water to make a weed-killing or plant growth regulating solution will not precipitate the calcium or magnesium salt of the polychlorophenoxyacetic acid in amount sufficient to interfere with the application and the effectiveness of the dilute solution. The invention also relates to a method of preventing such precipitation.

It is now customary to market 2,4-D and 2,4,5-T and mixtures thereof, to be used as a plant growth regulant and particularly as a weed-killer in the form of one or more of the amine salts thereof. These amine salts can be prepared as concentrated formulations, either as dry concentrates or as aqueous concentrated solutions, containing a high concentration of available 2,4-D or 2,4,5-T. These concentrated formulations can contain minor proportions of other known materials giving certain desired effects, such as wetting agents, spreaders, emulsifying agents, anti-freeze agents typified by methyl and ethyl alcohol, solid inert diluents, etc. These concentrated amine salt formulations are admixed in the field with a suitable proportion of water to give a solution having the final spray concentration. The various waters available in the field contain different quantities of calcium and magnesium salts and thus are said to vary in their hardness. Water is generally considered hard when it contains more than about 45 parts per million of dissolved calcium or magnesium. Since the calcium and magnesium salts of the polychlorophenoxyacetic acids are but sparingly soluble in water, when the concentrated formulations of the amine salts of such acids are admixed with hard water, precipitation of the calcium or magnesium salts of such acids occurs. The more calcium or magnesium dissolved in the water used for reduction to final spray concentration, the more calcium or magnesium salt of the polychlorophenoxyacetic acid is precipitated and the less effective is the herbicidal activity of the final spray solution. Furthermore such precipitation is additionally objectionable because during application of the diluted solution crystals of the calcium or magnesium salts of such acids are caught in the filters and spray nozzles, disrupting the uniform spreading of the spray solution over the area requiring treatment.

The principal object of the present invention is to provide concentrated polychlorophenoxyacetic acid amine salt formulations which are not subject to the foregoing objections. Another object is to provide a simple, economical and highly effective method of preventing the precipitation to an objectionable extent of insoluble salts of polychlorophenoxyacetic acid when such concentrated formulations are admixed with hard water. Numerous other objects of the present invention will be apparent to those skilled in the art from the following description.

I have discovered that tri-basic amine citrates are extremely effective to prevent precipitation when concentrated polychlorophenoxyacetic acid amine salt formulations are admixed with hard water for use in the field. I have found that the tri-basic amine citrates can most conveniently be incorporated directly in the concentrated formulations so that such tri-basic amine citrates are available to prevent such precipitation at the time when the formulation is diluted with water for field application.

The inclusion of such tri-basic amine citrates in concentrated polychlorophenoxyacetic acid amine salt formulations is especially advantageous because it does not introduce any objectionable foreign matter. For example, tri-sodium citrate is not satisfactory for incorporation with concentrated amine salt solutions of polychlorophenoxyacetic acid in water, because when it is so incorporated the insoluble sodium salt of such acid is formed and thrown out of solution; it is reported that the sodium salt of 2,4-D is soluble only to the extent of 3 to 4.5% in water. The tri-basic amine citrates of my invention are completely soluble in concentrated aqueous amine salt solutions of 2,4-D, 2,4,5-T and the like and their incorporation is not accompanied by any objectionable effect such as the precipitation just mentioned which would seriously interfere with saleability. When such aqueous concentrates are fortified with the tri-amine citrates in suitable amounts, no precipitation occurs at the time of mixing and no substantial precipitation occurs when such concentrates are diluted with hard water for spraying.

The tri-basic amine citrates used in the present invention contain one amine molecule attached to each of the three carboxylic acid groups of the citric acid molecule and thus are designated by the following formula:

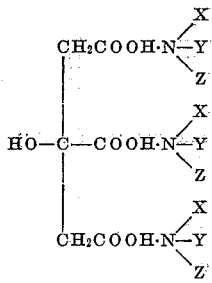

where X, Y and Z are each selected from the group consisting of hydrogen, lower alkyl and lower hydroxyalkyl, not more than two of the three groups X, Y and Z being hydrogen, and preferably not more than one of the three groups X, Y and Z being hydrogen. Such citrates are easily prepared by simply commingling citric acid with a primary, secondary or tertiary amine, preferably using three mols of the amine per mol of citric acid. X, Y and Z typically are methyl, ethyl, n-propyl, isopropyl, n-butyl, secondary butyl, tertiary butyl, beta-hydroxyethyl, gamma-hydroxypropyl, beta-hydroxyisopropyl, etc.

The amine salt of the polychlorophenoxyacetic acid with which my invention is concerned can be made by simply commingling the acid with the amine. The amine used can be any lower alkyl-, lower alkanol-, or lower alkyl—lower alkanol-amine having the general formula

where X, Y and Z are each selected from the group consisting of hydrogen, lower alkyl and lower hydroxyalkyl, not more than two of the three groups X, Y and Z being hydrogen, and preferably not more than one of them being hydrogen. Typical examples of X, Y and Z are the same as are given above in discussing the amines combined in the tri-basic amine citrate.

The aqueous concentrates are preferably prepared by adding the amine (which can be in solution in water) to an aqueous slurry of the polychlorophenoxyacetic acid (as is well-known, acids like 2,4-D acid and 2,4,5-T acid are insoluble in water) with agitation until the desired pH, generally 7–9, is obtained. Agitation is continued until complete solution is obtained. The actual weights used of amines typified by the alkanolamines can be readily determined, but when the amine is normally a gas or a highly volatile liquid and is added as such or as an aqueous solution where there may be losses, it is neither necessary nor usually expedient to determine the actual weight of the amine used, it being necessary only to add such an amount thereof as will bring the pH of the final concentrate within the desired range. A pH of at least 7 is usually desired and no advantage is attained by neutralizing to a pH over 9.

Those skilled in the art of formulating polychlorophenoxyacetic acid amine salt concentrates will be able to select a suitable amine for a particular result and to formulate a concentrate therewith. It is well-known that certain amines are adapted to the formulation of aqueous concentrates of high, say, 50% or over, polychlorophenoxyacetic acid concentration while certain other amines yield aqueous concentrates containing considerably less polychlorophenoxyacetic acid, say 20% to 30%.

Thus, the more highly water-soluble amine salts of 2,4-D and 2,4,5-T are those formed with diethanolamine, triethanolamine, diethylamine, triethylamine, dimethylamine, trimethylamine, diisopropanolamine, triisopropanolamine and monoisopropylamine. The monomethylamine, monoethylamine, monoethanolamine and monoisopropanolamine salts are less soluble in water. The following table indicates the water-solubility and some other properties of some of the amine salts of 2,4-D:

| Amine Used | Assay (2,4-D content) of Pure Dry Salt | Melting Range, °C. | Water Solubility, Percent |
|---|---|---|---|
| Methylamine | 87.5 | 160–170 | 25–30 |
| Dimethylamine | 82.9 | 115–120 | 40–50 |
| Trimethylamine | 78.8 | | 30–40 |
| Ethylamine | 82.9 | 130–134 | 20–25 |
| Diethylamine | 74.9 | | 40–50 |
| Triethylamine | 68.5 | | 60–65 |
| Isopropylamine | 78.8 | 115–120 | 30–40 |

The melting range and water solubility given in the table are only approximate.

The amines enumerated above are not full equivalents of one another. A choice of amines must be made by the formulator depending upon the requirements for the complete formulation. In the typical practice of my invention wherein the concentrate is made by bringing together the polychlorophenoxyacetic acid, the citric acid, water and the amine or mixture of amines, and any other desired ingredients, the amine or amines serve to neutralize the two acids, forming the amine salts thereof in situ; enough of the amine is used to completely neutralize both acids and bring the pH to at least 7. The formulator should bear in mind that the use of any one particular amine or combination of amines will depend upon the rest of the formulation and the physical properties required of it.

In formulating the aqueous concentrate, it will be borne in mind that amines which are suitable for making a concentrate containing, say, 20 to 25% of 2,4-D or 2,4,5-T may not be suitable for making a 50–60% concentrate with adequate freezing characteristics, and that any additive, whether herbicidally active or not, will have some effect on the physical properties of the finished formulation. Thus, a 40% 2,4-D aqueous concentrate containing no citrates will generally have somewhat better freezing characteristics than an identical concentrate wherein a portion of the water has been replaced by a tri-basic amine citrate in accordance with the present invention. To secure adequate freeze-resistance it is necessary to adjust the selection of amines used or their relative amounts. Certain amines are preferred by formulators by reason of providing good solubility of polychlorophenoxyacetic acid at low cost. Actual usage will depend upon the availability of the amines, their cost, the physical requirements of the product and the skill of the formulator. It may often be advantageous to incorporate a cheaper amine whose salt is less water-soluble and to compensate for this by using an alcohol, such as methyl or ethyl alcohol, in the recipe, thereby obtaining greater solubilization of the polychlorophenoxyacetic acid and greater freeze-resistance.

The following experiments (Examples 1 to 7) demonstrate the effectiveness of the tri-basic amine citrates for keeping the calcium salt of 2,4-D acid in solution and therefore for preventing objectionable precipitation of such calcium salt.

*Example 1*

I took 2.0 parts of the calcium salt of 2,4-D acid and stirred it overnight in 100 parts of distilled water; I then filtered, dried and weighed the material which had not dissolved at room temperature. I recovered 1.742 parts of the calcium salt of 2,4-D, 0.258 part remaining in solution in the 100 parts of water.

*Example 2*

I then duplicated Example 1 in every respect except that 1.71 parts of tris-dimethylammonium citrate was added to the mixture initially. In this case, 1.634 parts of the calcium salt of 2,4-D acid remained in solution in the 100 parts of water.

*Example 3*

Example 2 was duplicated, but using 3.0 parts of tris-triethanolammonium citrate in place of the tris-dimethylammonium citrate used in Example 2. In this case, 1.758 parts of the calcium salt of 2,4-D acid remained in solution in the 100 parts of water.

Examples 1 to 3 show the ability of the tri-basic amine citrates, to solubilize the calcium and in particular to dissolve any calcium salt of 2,4-D acid which tends to precipitate.

For use in Examples 4 to 11, test solutions containing a definite amount of calcium were made by dissolving a suitable amount of calcium carbonate in a small amount of dilute hydrochloric acid, neutralizing to slight alkalinity with ammonium hydroxide and diluting to the required volume with carbon dioxide-free distilled water.

*Example 4*

30 parts 2,4-D acid
0.5 part wetting agent

Dimethylamine (aqueous) and water were added to bring pH to 7–9 and the total weight to 100 parts. When 100 parts of this concentrate were dissolved in 1000 parts of water containing 240 parts per million of calcium, 2.83 parts of precipitate (dry) were recovered.

*Example 5*

30 parts 2,4-D acid
0.5 part wetting agent
1.8 parts citric acid

Dimethylamine and water added as in Example 4. When tested as in Example 4, 0.03 part of dried precipitate were recovered.

*Example 6*

30 parts 2,4-D acid

Dimethylamine and water were added as in Example 4. When 100 parts of this concentrate were dissolved in 1000 parts of water containing 400 parts per million of calcium, 4.70 parts of dried precipitate were recovered.

*Example 7*

30 parts 2,4-D acid
1.8 parts citric acid

Dimethylamine and water were added as in Example 4. When tested as in Example 6 0.07 part of precipitate (dry) were recovered.

*Example 8*

50 parts triethanolammonium 2,4-D
50 parts water

When 100 parts of this concentrate were dissolved in 1000 parts of water containing 400 parts per million of calcium, 5.23 parts of precipitate (dry) were obtained after filtration.

*Example 9*

50 parts triethanolammonium 2,4-D
0.5 part wetting agent
49.5 parts water

When 100 parts of this concentrate were dissolved in 1000 parts of water containing 400 parts per million of calcium, 3.39 parts of precipitate (dry) were obtained after filtration.

*Example 10*

50.0 parts triethanolammonium 2,4-D
0.3 part wetting agent
4.7 parts tris-diethanolammonium citrate
45.0 parts water When this concentrate was dissolved in water containing 400 parts per million of calcium as in Example 8, only 0.05 part precipitate (dry) were obtained after filtration.

*Example 11*

46.0 parts mono-isopropylammonium 2,4-D
3.5 parts tris-isopropylammonium citrate
50.5 parts water When this concentrate was dissolved in water containing 400 parts per million of calcium in the same way as in Example 8, there was obtained only 0.01 part of precipitate (dry) after filtration.

Consideration of the foregoing examples will show that the present invention can be practiced either by commingling the preformed tri-basic amine citrate with the preformed amine salt of the polychlorophenoxyacetic acid or by bringing together the polychlorophenoxyacetic acid, citric acid, water and the amine, these being used in such relative proportions that the resulting formulation preferably has a pH of at least 7 and has the desired concentration of polychlorophenoxyacetic acid and tri-basic amine citrate, the same amine or amine mixture serving to neutralize both acid components.

The tri-basic amine citrate can even be incorporated at the time when the concentrate is mixed with water in the field to give the final spraying solution. This has the advantage that the actual amount of tri-basic amine citrate required for the particular hard water involved can be used.

My invention can be applied to the production of a dry powdered concentrate of a polychlorophenoxyacetic acid (especially 2,4-D or 2,4,5-T or a mixture thereof). Thus I can prepare a dry (anhydrous or substantially so) salt formulation containing a high concentration of the polychlorophenoxyacetic acid and high water solubility so that a spray solution of any desired strength can be easily prepared in the field, using any water that is available, without objectionable precipitation occurring regardless of the hardness of the water employed. Such a dry powdered formulation can be made by simply intimately commingling in suitable proportions an amine salt of the polychlorophenoxyacetic acid and a tri-basic amine citrate or components capable of forming said salts. Relative proportions such that the citric acid content ranges from 2 to 15% by weight based on the polychlorophenoxyacetic acid are preferred. For convenience, the amine can be incorporated as an aqueous solution with the dry polychlorophenoxyacetic acid and the dry citric acid, the ingredients being intimately blended together and dried (at low temperature to prevent thermal decomposition or loss of volatiles) to remove water to such an extent as to give a free-flowing pourable powder which can be shipped and handled in the manner customary for dry powdered solids as distinct from liquids. I can easily make a dry formulation containing over 60% of polychlorophenoxyacetic acid by using an amine component containing more than 50%, and better still more than 75%, of methylamine. I can make a dry formulation containing over 75% of polychlorophenoxyacetic acid. A wetting agent is often included in such dry formulations to promote mixing with water in the field and facilitate application to plants.

Whether an aqueous concentrate or a dry powdered formulation be made by my invention, the relative proportion of amine to citric acid and polychlorophenoxyacetic acid preferably is such as to completely neutralize the acids and give a product which upon admixture with water gives a solution preferably having a pH of at least 7.

By using a suitable amount of the tri-basic amine citrate, objectionable precipitation can be prevented in waters of any degree of hardness, for example, ranging from 40 parts per million to over 1,200 parts per million of dissolved calcium and magnesium. For best results under the wide variety of conditions encountered in the field, I prefer to employ an amount of tri-basic amine citrate such that the amount of citric acid present ranges from 2 to 15% by weight based on the weight of polychlorophenoxyacetic acid present in the formulation.

The concentrates of my invention almost invariably contain at least 20% by weight of polychlorophenoxyacetic acid, this acid being present in combined form as the amine salt. The polychlorophenoxyacetic acid content may be as high as 60% or even higher. The concentrate also preferably contains a suitable amount of a conventional wetting agent. The wetting agent constitutes no part of the present invention since the selection thereof and of the amount thereof are well within the skill of the art. Any of the known wetting agents which are compatible with the other ingredients of the concentrate and which produce no objectionable effects either in the concentrate or in the diluted form thereof, can be used. The concentrate can also contain a suitable proportion of an alcohol, such as methyl or ethyl alcohol, which functions as a solubilizing agent for increasing the concentration of polychlorophenoxyacetic acid in the mixture and as an anti-freeze, as discussed above.

The following Examples 12 to 26 show typical 2,4-D amine salt concentrates containing tri-basic amine citrates in amount sufficient for waters of various hardness such as are encountered in the field. The method of making the formulations will be obvious in the light of the foregoing discussion. As before, all parts are by weight.

*Example 12*

Ethylammonium 2,4-D _____dry powder___ 100
Tris-diethanolammonium citrate_____recipe___ 5

*Example 13*

2,4-D acid _____ 100
Citric acid _____dry powder___ 2.1
Triethanolamine _____recipe___ 4.4
Ethylamine (70% aqueous) to pH 9.
Dry at low temperature and blend.

| Example Nos. | 14 | 15 | 16 |
|---|---|---|---|
| 2,4-D Acid | 30 | 30 | 30 |
| Triethanolamine | 20 | 20 | 10 |
| Wetting Agent | 0.5 | 0.5 | 0.5 |
| Tris-Triethylammonium Citrate (56% aqueous) | 10 | 10 | 10 |
| Methanol | | 10 | |
| Triethylamine (88% aqueous) | | | 8 |
| Water to a Total of 100 parts | | | |

*Example 17*

2,4-D acid _____ 60
Triethylamine (88% aqueous) to pH 7 _____ 9
Citric acid _____ 2.6
Water to total 100.

*Example 18*

2,4-D acid _____ 29.6
Triethanolamine _____ 23.8
Diethanolamine _____ 3.8
Citric acid _____ 2.35
Wetting agent _____ 0.5
Water to total 100.

*Example 19*

2,4-D acid _____ 41
Mixed isopropanolamines _____ 14
Citric acid _____ 3.1
Diethanolamine _____ 9
Triethanolamine _____ 11
Wetting agent _____ 0.5
Water to total 100.

| Example Nos. | 20 | 21 |
|---|---|---|
| 2,4-D Acid | 40 | 50 |
| Tris-Diethanolammonium Citrate | 5 | 5 |
| Sharsol 241 (aqueous mixture of diethylamine and triethylamine) | 14 | 17.5 |
| Water To Total 100. | | |

*Example 22*

2,4-D acid _____ 55
Sharsol 241 _____ 8.7
Tris-diethanolammonium citrate _____ 6
Dimethylamine to pH 7–9.
Water to total 100.

Example 23

| | |
|---|---|
| 2,4-D acid | 30 |
| Citric acid | 2.35 |
| Diethanolamine | 3.85 |
| Wetting agent | 0.5 |

Dimethylamine to pH 7–9.
Water to total 100.

Example 24

| | |
|---|---|
| 2,4-D acid | 30.5 |
| Citric acid | 1.8 |
| Wetting agent | 0.5 |

Isopropylamine to pH 7–9.
Water to total 100.

Example 25

| | |
|---|---|
| 2,4-D acid dry powder | 41 |
| Citric acid | 2 |

Methylamine (aqueous) to pH 9.
Dry at low temperature and blend.

Example 26

| | |
|---|---|
| 2,4-D acid | 16.4 |
| Citric acid dry powder | 0.8 |
| Wetting agent | 0.2 |

Methylamine (aqueous) to pH 9.
Dry at low temperature and blend.

Examples 12 to 26 exemplify the use of the following amines: methylamine, dimethylamine, ethylamine, diethylamine, triethylamine, isopropylamine, diethanolamine, triethanolamine, isopropanolamine, diisopropanolamine and triisopropanolamine. Ethanolamine can be tolerated in small amounts. Trimethylamine is an excellent replacement for the amines exemplified.

The foregoing description has dealt with the organic amine citrates. However, tri-ammonium citrate can also be used in the case of the aqueous concentrates of lower concentrations, e. g., 20 to 35% polychlorophenoxyacetic acid. Ammonia is an inorganic amine and in such concentrates of lower concentration appears to be an equivalent of the organic amines insofar as neutralizing the citric acid and forming a tri-basic amine citrate effective to prevent precipitation with hard water are concerned. Ammonia is often present in substantial amounts as an impurity in commercial organic amines. It will be understood by those skilled in the art that when ammonia is used in conjunction with an organic amine for neutralizing the citric acid, an equilibrium will be established during the formulation or upon admixture with water whereby the ammonia and the organic amine will distribute themselves between the citric acid and the polychlorophenoxyacetic acid. It should be pointed out that the amount of ammonia which can be used in the formulation should not exceed that required for neutralization of the citric acid; the reason for this limitation is the limited solubility of ammonium polychlorophenoxyacetate.

Example 27 below illustrates the use of ammonia in conjunction with an organic amine in the practice of my invention. It was unexpected to find that, although the sodium and ammonium salts of 2,4-D acid reportedly have similar water solubilities, the use of sufficient sodium hydroxide to neutralize the citric acid throws down a precipitate in a 30% concentrate, whereas the use of ammonium hydroxide in amount sufficient to neutralize the citric acid does not cause precipitation in such a concentrate.

Example 27

| | |
|---|---|
| 2,4-D acid | 31 |
| Citric acid | 1.8 |
| Wetting agent | 0.5 |
| Ammonium hydroxide (20%) | 2.5 |

Dimethylamine (aqueous) to pH 7–9.
Water to total 100.

From Example 27 and the discussion preceding it, it will be seen that the expression "tri-basic amine citrate" as used herein and in the claims is intended to include both organic amine citrates and tri-ammonium citrate, unless otherwise indicated. However, tri-ammonium citrate is not the full equivalent of the organic amine citrates in all formulations, as is indicated above. For most formulations, I prefer to use the organic amines rather than ammonia.

While the foregoing examples all involve the use of 2,4-D acid, it should be pointed out that 2,4,5-T amine salt concentrates give even more trouble with hard water than 2,4-D acid and the principles of my invention are equally applicable either to 2,4-D acid or 2,4,5-T acid. It is often the practice to market a mixture containing both 2,4-D and 2,4,5-T acids and my invention can be applied to such mixtures.

The aqueous and dry concentrated formulations of my invention are characterized by the fact that they are composed exclusively of water-soluble components. Thus the aqueous concentrates are completely in solution while the dry powdered formulations are easily and completely dissolved in water by simple admixture therewith.

The aqueous concentrates of my invention generally contain at least 20% by weight of polychlorophenoxyacetic acid while the dry powdered concentrates usually contain at least 50% of polychlorophenoxyacetic acid and preferably at least 75% thereof.

My invention is based upon my discovery that the complex formed between the tri-basic amine citrate and the calcium or magnesium ion has sufficient stability to minimize the formation of insoluble calcium or magnesium polychlorophenoxyacetate upon dilution with hard water. My invention is further based upon my discovery that tri-basic amine citrates are completely soluble in concentrated amine salt solutions of polychlorophenoxyacetic acid and when such concentrated solutions or the dry concentrates are fortified with appropriate amounts of the tri-basic amine citrates, precipitation to an objectionable extent is prevented when such concentrated materials are admixed with hard water for spraying.

From the foregoing, it will be seen that the present invention provides a simple, economical and commercially feasible method of preventing the objectionable precipitation which normally occurs when polychlorophenoxyacetic acid amine salt formulations are mixed with hard water. The cost of incorporating the tri-basic amine citrate in accordance with my invention is low. The introduction of the tri-basic amine citrate produces no objectionable effects and avoids the introduction of foreign matter (such as material containing sodium) which might not be compatible or which might cause undesired side effects. The formulations produced by the present invention are stable upon storage, handling and use. The dry powdered formulations of my invention are especially advantageous because, in addition to the advantages already mentioned, they contain a maximum proportion of polychlorophenoxyacetic acid and avoid the objections incident to handling liquid formulations. Many other advantages of my invention will be apparent to those skilled in the art.

Having thus described my invention, what I claim and desire to protect by Letters Patent is:

1. As a new composition of matter, a concentrated formulation of an organic amine salt of polychlorophenoxyacetic acid, said acid being present in amount equal to at least 20% by weight of said formulation, said formulation containing a tri-basic amine citrate having the formula

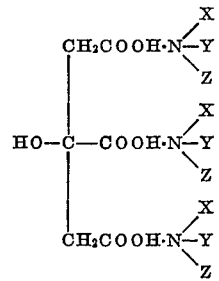

where X, Y and Z are each selected from the group consisting of hydrogen, lower alkyl and lower hydroxyalkyl, not more than two members of each series of X, Y and Z being hydrogen, said citrate being present in amount effective to prevent objectionable precipitation upon dissolution of said formulation in hard water.

2. As a new composition of matter, a concentrated formulation of an organic amine salt of 2,4-dichlorophenoxyacetic acid, said acid being present in amount equal to at least 20% by weight of said formulation, said formulation containing a tri-basic amine citrate having the formula

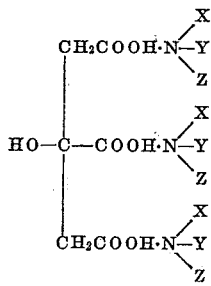

where X, Y and Z are each selected from the group consisting of hydrogen, lower alkyl and lower hydroxyalkyl, not more than two members of each series of X, Y and Z being hydrogen, said citrate being present in amount effective to prevent objectionable precipitation upon dissolution of said formulation in hard water.

3. As a new composition of matter, a concentrated aqueous solution of an organic amine salt of 2,4-dichlorophenoxyacetic acid, said solution containing at least 20% by weight of said acid and having dissolved therein a tri-basic amine citrate having the formula

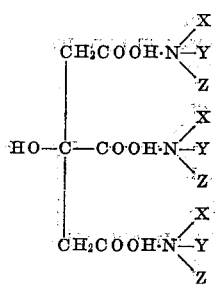

where X, Y and Z are each selected from the group consisting of hydrogen, lower alkyl and lower hydroxyalkyl, not more than two members of each series of X, Y and Z being hydrogen, said citrate being present in amount effective to prevent objectionable precipitation upon dilution of said solution with hard water.

4. As a new composition of matter, a dry powdered concentrated formulation of an organic amine salt of 2,4-dichlorophenoxyacetic acid, said acid being present in amount equal to at least 50% by weight of said formulation, said formulation containing a tri-basic amine citrate having the formula

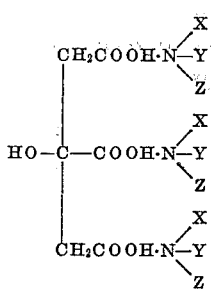

where X, Y and Z are each selected from the group consisting of hydrogen, lower alkyl and lower hydroxyalkyl, not more than two members of each series of X, Y and Z being hydrogen, said citrate being present in amount effective to prevent objectionable precipitation upon dissolution of said formulation in hard water.

5. As a new composition of matter, a concentrated formulation of an organic amine salt of 2,4-dichlorophenoxyacetic acid, said acid being present in amount equal to at least 20% by weight of said formulation, said formulation containing from 2 to 15% by weight based on the weight of said acid of citric acid in the form of a tri-basic amine citrate having the formula

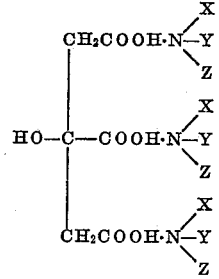

where X, Y and Z are each selected from the group consisting of hydrogen, lower alkyl and lower hydroxyalkyl, not more than two members of each series of X, Y and Z being hydrogen, said citrate being effective to prevent objectionable precipitation upon dissolution of said formulation in hard water.

6. As a new composition of matter, a concentrated aqueous solution of an organic amine salt of 2,4-dichlorophenoxyacetic acid, said solution containing at least 20% by weight of said acid and having dissolved therein from 2 to 15% by weight based on the weight of said acid of citric acid in the form of a tri-basic amine citrate having the formula

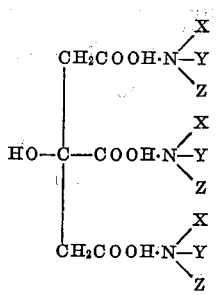

where X, Y and Z are each selected from the group consisting of hydrogen, lower alkyl and lower hydroxyalkyl, not more than two members of each series of X, Y and Z being hydrogen, said citrate being effective to prevent objectionable precipitation upon dilution of said formulation with hard water.

7. As a new composition of matter, a dry powdered concentrated formulation of an organic amine salt of 2,4-dichlorophenoxyacetic acid, said acid being present in amount equal to at least 50% by weight of said formulation, said formulation containing from 2 to 15% by weight based on the weight of said acid of citric acid in the form of a tri-basic amine citrate having the formula

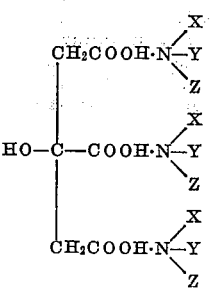

where X, Y and Z are each selected from the group consisting of hydrogen, lower alkyl and lower hydroxyalkyl, not more than two members of each series of X, Y and Z being hydrogen, said citrate being effective to prevent objectionable precipitation upon dissolution of said formulation in hard water.

8. A dilute hard water solution suitable for field application for weed-killing and plant growth regulation, said solution comprising an organic amine salt of 2,4-dichlorophenoxyacetic acid and a tri-basic amine citrate having the formula

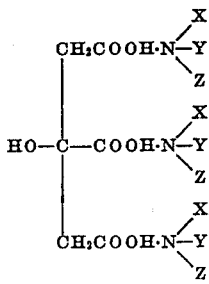

where X, Y and Z are each selected from the group consisting of hydrogen, lower alkyl and lower hydroxyalkyl, not more than two members of each series of X, Y and Z being hydrogen, said citrate being present in an amount providing from 2 to 15% by weight of citric acid based on the weight of said 2,4-dichlorophenoxyacetic acid and serving to prevent objectionable precipitation of insoluble calcium and magnesium salts of said 2,4-dichlorophenoxyacetic acid.

9. A method of preventing objectionable precipitation upon dissolution of a concentrated formulation of an organic amine salt of 2,4-dichlorophenoxyacetic acid in hard water to give a dilute solution suitable for field application, said formulation containing at least 20% by weight of said acid, which comprises effecting said admixture in the presence of a tri-basic amine citrate having the formula

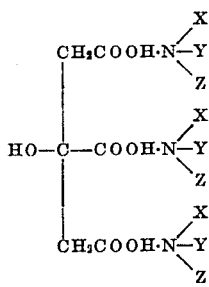

where X, Y and Z are each selected from the group consisting of hydrogen, lower alkyl and lower hydroxyalkyl, not more than two members of each series of X, Y and Z being hydrogen, said citrate being present in an amount providing from 2 to 15% by weight of citric acid based on the weight of said 2,4-dichlorophenoxyacetic acid.

10. A method of preventing objectionable precipitation upon dissolution of a concentrated formulation of an organic amine salt of 2,4-dichlorophenoxyacetic acid in hard water to give a dilute solution suitable for field application, said formulation containing at least 20% by weight of said acid, which comprises incorporating in said formulation a tri-basic amine citrate having the formula

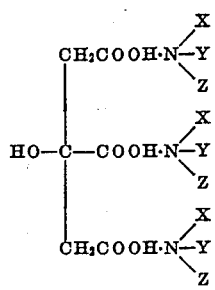

where X, Y and Z are each selected from the group consisting of hydrogen, lower alkyl and lower hydroxyalkyl, not more than two members of each series of X, Y and Z being hydrogen, said citrate being present in an amount providing from 2 to 15% by weight of citric acid based on the weight of said 2,4-dichlorophenoxyacetic acid.

11. A herbicidal composition of matter comprising a mixture of at least one member of the group consisting of the dimethylamine, the diethylamine and the isopropylamine salts of 2,4-dichlorophenoxyacetic acid in in a phytotoxic concentration and at least one member of the group consisting of the dimethylamine, the diethylamine and the isopropylamine salts of citric acid, said amine-citrates of the latter group being present in an amount sufficient to prevent objectionable precipitation of insoluble calcium and magnesium salts of said 2,4-dichlorophenoxyacetic acid by the calcium and magnesium ions present in hard water.

12. A dry non-hygroscopic herbicidal composition comprising a mixture of at least one member of the group consisting of the dimethylamine, the diethylamine and the isopropylamine salts of 2,4-dichlorophenoxyacetic acid and at least one member of the group consisting of the dimethylamine, the diethylamine and the isopropylamine salts of citric acid, the salts being dry and the amine-citrates of the latter group being present in an amount sufficient to prevent objectionable precipitation of insoluble calcium and magnesium salts of said 2,4-dichlorophenoxyacetic acid by the calcium and magnesium ions present in hard water when the composition is mixed with such hard water.

13. A composition of matter comprising the mixture recited in claim 12 and an extender.

14. A composition of matter comprising the mixture recited in claim 12 and water.

15. A dry, stable, non-hygroscopic herbicidal composition of matter comprising a mixture of the dry isopropylamine salts of 2,4-dichlorophenoxyacetic acid and of citric acid, said amine citrate being present in an amount sufficient to prevent objectionable precipitation of insoluble calcium and magnesium salts of said 2,4-dichlorophenoxyacetic acid by the calcium and magnesium ions present in hard water.

References Cited in the file of this patent

UNITED STATES PATENTS

| Number | Name | Date |
| --- | --- | --- |
| 2,264,103 | Tucker | Nov. 25, 1941 |

OTHER REFERENCES

Agricultural Chemicals, April 1949, pages 27 to 29 and 73.